(12) United States Patent
Chiu et al.

(10) Patent No.: US 11,539,939 B2
(45) Date of Patent: Dec. 27, 2022

(54) VIDEO PROCESSING METHODS AND APPARATUSES FOR HORIZONTAL WRAPAROUND MOTION COMPENSATION IN VIDEO CODING SYSTEMS

(71) Applicant: MEDIATEK INC., Hsinchu (TW)

(72) Inventors: Chih-Yao Chiu, Hsinchu (TW); Chun-Chia Chen, Hsinchu (TW); Chih-Wei Hsu, Hsinchu (TW); Ching-Yeh Chen, Hsinchu (TW); Yu-Wen Huang, Hsinchu (TW); Tzu-Der Chuang, Hsinchu (TW)

(73) Assignee: HFI Innovation Inc., Hsinchu (TW)

(*) Notice: Subject to any disclaimer, the term of this patent is extended or adjusted under 35 U.S.C. 154(b) by 0 days.

(21) Appl. No.: 17/104,037

(22) Filed: Nov. 25, 2020

(65) Prior Publication Data

US 2021/0160482 A1 May 27, 2021

Related U.S. Application Data

(60) Provisional application No. 62/940,958, filed on Nov. 27, 2019.

(51) Int. Cl.
*H04N 19/159* (2014.01)
*H04N 19/105* (2014.01)
*H04N 19/176* (2014.01)
*H04N 19/30* (2014.01)
*H04N 19/46* (2014.01)
*H04N 19/52* (2014.01)

(52) U.S. Cl.
CPC ......... *H04N 19/105* (2014.11); *H04N 19/159* (2014.11); *H04N 19/176* (2014.11); *H04N 19/30* (2014.11); *H04N 19/46* (2014.11); *H04N 19/52* (2014.11)

(58) Field of Classification Search
CPC .. H04N 19/105; H04N 19/159; H04N 19/176; H04N 19/30; H04N 19/46; H04N 19/52
See application file for complete search history.

(56) References Cited

U.S. PATENT DOCUMENTS

| | | | |
|---|---|---|---|
| 2018/0278940 A1* | 9/2018 | Park | H04N 19/136 |
| 2021/0014504 A1* | 1/2021 | Xu | H04N 19/176 |
| 2021/0029371 A1* | 1/2021 | Seregin | H04N 19/44 |
| 2021/0051341 A1* | 2/2021 | Seregin | H04N 21/234363 |

* cited by examiner

*Primary Examiner* — Dave Czekaj
*Assistant Examiner* — Berteau Joisil
(74) *Attorney, Agent, or Firm* — Oblon, McClelland, Maier & Neustadt, L.L.P.

(57) ABSTRACT

Video processing methods and apparatuses for processing a current block in a current picture include receiving input data of the current block, determining a reference picture, determining whether picture sizes of the current and reference pictures are different, determining whether horizontal wraparound motion compensation is enabled for predicting the current block, performing motion compensation for the current block to obtain a reference block from the reference picture, and encoding or decoding the current block according to the reference block. Horizontal wraparound motion compensation is disabled when the picture sizes of the current and reference pictures are different.

19 Claims, 5 Drawing Sheets

Ref 1         Ref 0         Current Picture

VIDEO PROCESSING METHODS AND APPARATUSES FOR HORIZONTAL WRAPAROUND MOTION COMPENSATION IN VIDEO CODING SYSTEMS

CROSS REFERENCE TO RELATED APPLICATION

The present invention claims priority to U.S. Provisional Patent Application Ser. No. 62/940,958, filed on Nov. 27, 2019, entitled "New Method for Horizontal Wraparound Motion Compensation Signaling". The U.S. Provisional Patent Application is hereby incorporated by reference in its entirety.

FIELD OF THE INVENTION

The present invention relates to video processing methods and apparatuses in video encoding and decoding systems. In particular, the present invention relates to horizontal wraparound motion compensation.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities. The HEVC standard relies on a block-based coding structure which divides each video slice into multiple square Coding Tree Units (CTUs), where a CTU is the basic unit for video compression in the HEVC standard. A raster scan order is used to encode or decode CTUs in each slice. Each CTU may contain one Coding Unit (CU) or recursively split into four smaller CUs according to a quad-tree partitioning structure until a predefined minimum CU size is reached. The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. Motion estimation in inter picture prediction identifies one (uni-prediction) or two (bi-prediction) best reference blocks for a current block in one or two reference picture, and motion compensation in inter picture prediction locates the one or two best reference blocks according to one or two Motion Vectors (MVs). A difference between the current block and a corresponding predictor is called prediction residual. The corresponding predictor is the best reference block when uni-prediction is used. When bi-prediction is used, the two reference blocks are combined to form the predictor.

Reference Picture Resampling (RPR) In the development of the upcoming emerging video coding standard Versatile Video Coding (VVC), fast representation switching for adaptive streaming services is desired to offer multiple representations of the same video content, each having difference properties. Different properties involve with different spatial resolutions or different sample bit depths. In real-time video communications, by allowing resolution change within a coded video sequence without inserting an I-picture, not only the video data can be adapted to dynamic channel conditions and user preference seamlessly, but the beating effect caused by the I-pictures can also be removed. FIG. 1 illustrates an example of applying reference picture resampling to encode or decode a current picture, where the current picture is predicted from reference pictures of different sizes. Spatial scalability is beneficial in streaming applications. The picture size of the reference picture can be different from the current picture when spatial scalability is supported. Reference Picture Resampling (RPR), also known as Adaptive Resolution Change (ARC), has been studied and evaluated during the development of the upcoming emerging video coding standard.

Horizontal Wraparound Motion Compensation Horizontal wraparound motion compensation is a 360-specific coding tool designed to improve the visual quality of the reconstructed 360-degree video in an Equi-Rectangular Projection (ERP) format. In conventional motion compensation, repetitive padding is applied to derive values of out-of-bounds samples when a motion vector refers to samples beyond the picture boundaries of the reference picture. A value of an out-of-bounds sample derived from repetitive padding directly copies a value from a nearest neighboring sample on the corresponding picture boundary. For 360-degree video pictures, repetitive padding for picture boundaries is not appropriate as it causes visual artifacts called seam artifacts in reconstructed viewport video. 360-degree video is captured on a sphere and inherently there is no boundary, in other words, reference samples that are out of the boundaries of a reference picture in the projected domain can always be obtained from neighboring samples in the spherical domain. For a general projection format, it may be difficult to derive corresponding neighboring samples in the spherical domain as it involves 2D-to-3D and 3D-to-2D coordinate conversion as well as sample interpolation for fractional sample positions. However, deriving corresponding neighboring samples in the ERP projection format is much simpler as the spherical neighboring samples outside of the left picture boundary can be obtained from samples inside the right picture boundary, and vice versa. Given the wide usage of the ERP projection format and the relative ease of implementation, horizontal wraparound motion compensation is proposed in the upcoming emerging video coding standard to improve the visual quality of 360-video coded in the ERP projection format.

FIG. 2 illustrates an example of a horizontal wraparound motion compensation process with a Padded ERP (PERP) format. The PERP projection format was proposed to reduce the subjective artifact in the ERP projection format. Padding is applied to convert each ERP picture to a PERP picture prior to the encoding process by copying pixels. For example, pixels will be replicated from the left edge region of a current picture 20, to the padding region on the right edge region of the current picture 20. Similarly, pixels will be replicated from the right edge region of the current picture 20, to the padding region on the left edge region of the current picture 20. The PERP format picture is then encoded by the video encoder. After decoding by the video decoder, the reconstructed PERP picture is converted back to the reconstructed ERP format by cropping of the left and right padded pixels. In this example, a current CU 202 in the current picture 20 is coded by horizontal wraparound motion compensation. A reference block 224 in a reference picture 22 is located by a motion vector from a co-located CU 222. Since a part of the reference block 224 is outside of the left boundary of the reference picture 22 in the projected domain, instead of repetitive padding, the out-of-boundary part is taken from the corresponding spherical neighboring samples that are located within the reference picture 22 toward the right boundary in the projected domain. In this example, the out-of-boundary part is obtained from a wrapped-around reference block 226 according to a wrap-around offset. A high-level syntax element is signaled in a Sequence Parameter Set (SPS) to indicate the wraparound offset. The wraparound offset for performing horizontal wraparound motion compensation on all blocks in any picture referring to the same SPS are the same. For example, the wraparound offset is set to be equal to an ERP picture width before padding. The ERP width is equal to a picture width of the PERP format picture taking away a left padding margin of the left padding region and a right padding margin of the right padding region. Repetitive padding is only used for the top and bottom picture boundaries. As depicted in FIG. 2, horizontal wraparound motion compensation can be combined with the non-normative padding method often used in the 360-degree video coding. The wraparound offset signaled in the SPS is used to calculate positions of wrapped-around reference blocks in pictures referring to the SPS. The wraparound offset syntax element is not affected by the specific amount of padding on the left and right picture boundaries, and therefore, naturally supports asymmetric padding of the ERP picture. Asymmetric padding of the ERP picture allows left and right padding margins to be different. The horizontal wraparound motion compensation process provides more meaningful information for motion compensation when the reference samples are outside of the reference picture's left and right boundaries. This horizontal wraparound motion compensation coding tool improves compression performance not only in terms of rate-distortion performance, but also in terms of reducing seam artifacts and improving subjective quality of the reconstructed 360-degree video. The horizontal wraparound motion compensation can also be used for other single face projection formats with constant sampling density in the horizontal direction, such as adjusted equal-area projection in 360Lib.

BRIEF SUMMARY OF THE INVENTION

In exemplary embodiments of the video processing method for processing a current block in a current picture, a video coding system implementing the video processing method receives input video data associated with the current block, determines a reference picture for the current block, determines whether picture sizes of the current picture and the reference picture are the same, determines whether horizontal wraparound motion compensation is enabled for predicting the current block, and accordingly performs motion compensation for the current block to obtain a reference block from the reference picture. Horizontal wraparound motion compensation is disabled when the picture sizes of the current picture and the reference picture are different. In cases when horizontal wraparound motion compensation is enabled for predicting the current block, an out-of-boundary part is located within the reference picture toward a left/right boundary when a part of the reference block is outside of a right/left boundary of the reference picture. The current block is encoded or decoded the current block according to the reference block.

In some exemplary embodiments, the step of determining whether picture sizes of the current picture and the reference picture are the same includes comparing a picture width of the current picture with a picture width of the reference picture. The picture sizes of the current picture and the reference picture are different when the picture width of the current picture and the picture width of the reference picture are different. In one embodiment, a picture height of the current picture is further compared with a picture height of the reference picture, and the picture sizes of the current picture and the reference picture are different when one or both the picture widths and the picture heights are different.

In an exemplary embodiment, the step of determining whether picture sizes of the current picture and the reference picture are the same includes checking if horizontal scaling is required for scaling the reference picture, and the picture sizes of the current picture and the reference picture are different when horizontal scaling is applied to scale the reference picture for predicting the current block in the current picture. In another embodiment, the video processing method checks if scaling is required for scaling the reference picture, and the picture sizes of the current picture and the reference picture are different when one or both horizontal scaling and vertical scaling is applied to scale the reference picture for predicting the current block in the current picture.

In some embodiments, horizontal wraparound motion compensation is disabled when the picture sizes are different or when scaling is applied to the reference picture. For example, the video processing method includes determining scaling is applied to the reference picture when picture output widths of the current picture and the reference picture are different. The video processing method may also compare picture output heights of the current picture and the reference picture, and horizontal wraparound motion compensation is disabled when the picture output heights of the current and reference pictures are different. In another example, the video processing method includes determining scaling is applied to the reference picture when at least one of scaling window offsets at four sides of the current picture is different from a corresponding scaling window offset of the reference picture.

In some exemplary embodiments, horizontal wraparound motion compensation is disabled when inter-layer referencing is allowed, for example, an inter-layer reference picture present flag is equal to one specifying inter-layer referencing is allowed in inter prediction.

Horizontal wraparound motion compensation is disabled when reference picture resampling is enabled according to an embodiment. Reference picture resampling supports spatial scalability by allowing picture sizes of reference pictures different from the current picture.

A video decoding system parses a wraparound enable flag and determines whether horizontal wraparound motion compensation is enabled for predicting the current block. Horizontal wraparound motion compensation is not used to predict the current block when the wraparound enable flag is equal to zero. The wraparound enable flag is parsed from one or a combination of a CU level, picture level, and sequence level. For example, a SPS wraparound enable flag is parsed from a SPS, a PPS wraparound enable flag is then parsed from a PPS if the SPS wraparound enable flag is true.

The video coding system determines a wraparound offset when horizontal wraparound motion compensation is enabled for predicting the current block. The wraparound offset is used to locate the out-of-bound part within the reference block toward the left or right boundary. The wraparound offset is signaled in or parsed from a PPS according to one embodiment.

Aspects of the disclosure further provide an apparatus for video processing in a video coding system encoding or decoding blocks, and horizontal wraparound motion compensation is disabled when picture sizes of the current and reference pictures are different. The apparatus comprises one or more electronic circuits configured for receiving input video data of a current block in a current picture, determining a reference picture, determining whether picture sizes of the current picture and the reference picture are the same, determining whether horizontal wraparound motion compensation is enabled for predicting the current block, performing motion compensation for the current block to obtain a reference block from the reference picture, and encoding or decoding the current block according to the reference block. Horizontal wraparound motion compensation is disabled when the picture sizes of the current and reference pictures are different. When horizontal wraparound motion compensation is enabled for predicting the current block, an out-of-boundary part is located within the reference picture toward a left/right boundary when a part of the reference block is outside of a right/left boundary of the reference picture.

Aspects of the disclosure further provide a non-transitory computer readable medium storing program instructions for causing a processing circuit of an apparatus to perform a video processing method to encode or decode a current block. Horizontal wraparound motion compensation is disabled when picture sizes of current and reference pictures are different. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 1:
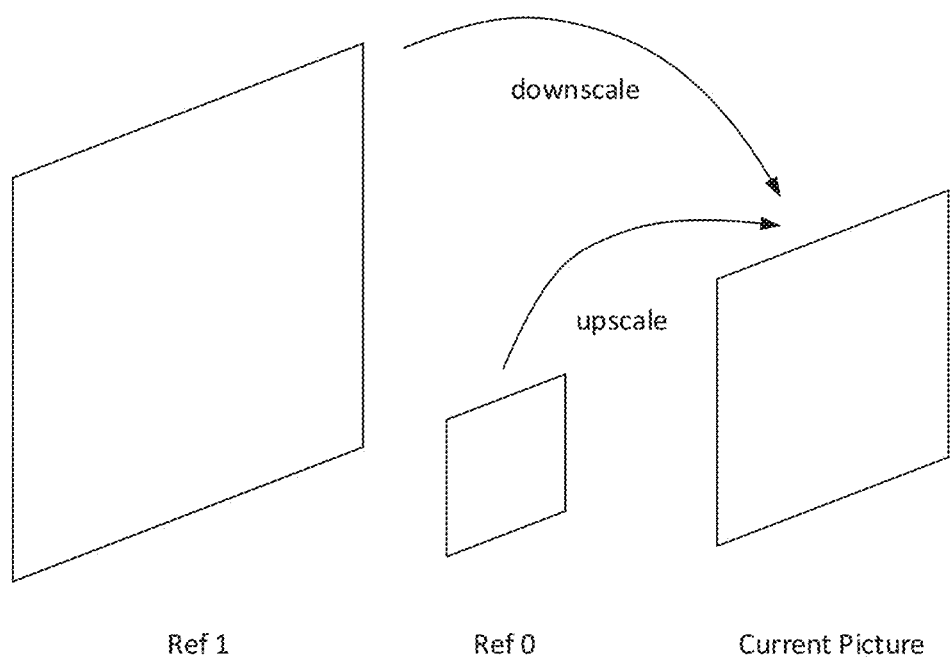
FIG. 1 illustrates a hypothetical example of enabling adaptive resolution change.
Figure 2:
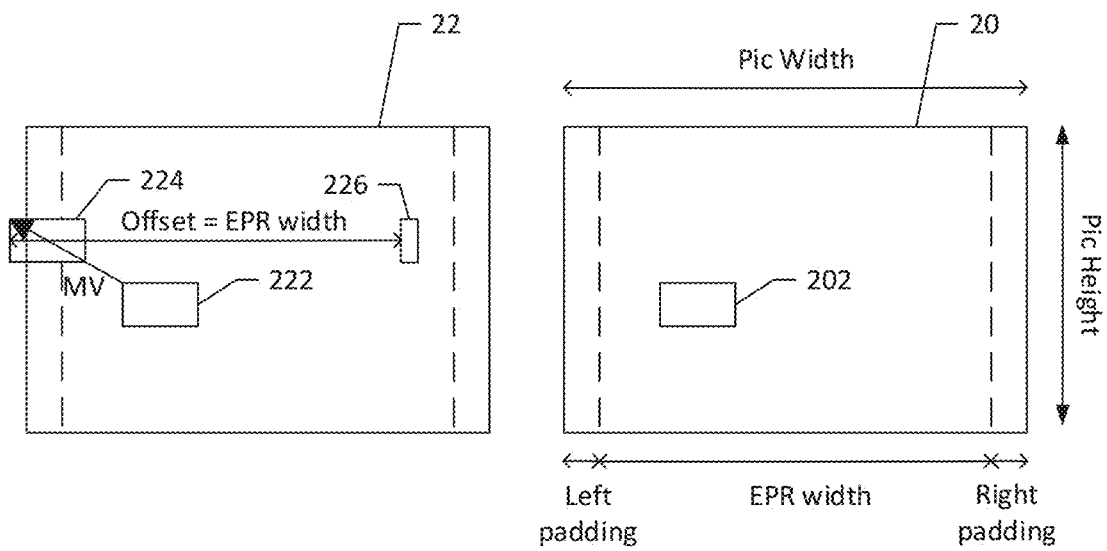
FIG. 2 illustrates an example of applying horizontal wraparound motion compensation to locate a reference block.
Figure 3:
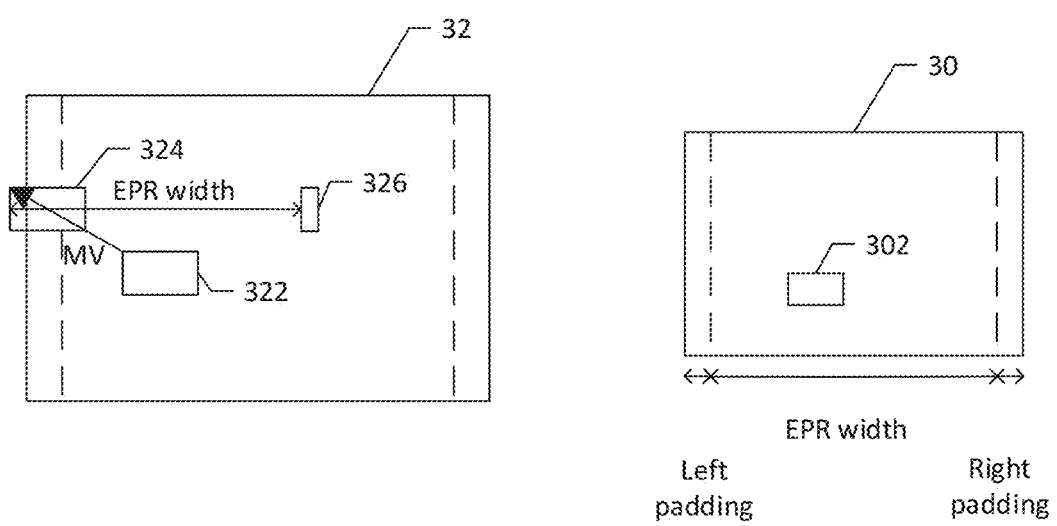
FIG. 3 illustrates an example of applying horizontal wraparound motion compensation to a current block in a current picture referencing a reference block in a reference picture having a difference size from the current picture.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

There are several shortcomings in implementing the current version of horizontal wraparound motion compensation in video encoders and decoders. For example, the wraparound offset is signaled in a sequence level in the current version of horizontal wraparound motion compensation so the value of the wraparound offset is remained the same for all blocks in pictures referring to the same SPS. The wraparound offset is set to be equal to the Equi-Rectangular Projection (ERP) width for 360 degree video coded with the Padded ERP (PERP) format. However, the wraparound offset should be different for reference pictures with different resolutions when RPR is enabled. Another problem is that under the current version, horizontal wraparound motion compensation is disabled for all blocks in pictures referring to a SPS as long as one of the pictures referring to the SPS violates a conformance regulation. The conformance regulation is associated with a comparison between a value of (CtbSizeY/MinCbSizeY+1) and a value of (pic_width_in_luma_samples/MinCbSizeY−1), where CtbSizeY represents a predefined size of a luma Coding Tree Block (CTB), MinCbSizeY represents a predefined minimum allowed luma Coding Block (CB) size, and pic_width_in_luma_samples represents a picture width in luma samples of any picture referring to the SPS. The conformance regulation forces to disable horizontal wraparound motion compensation at the sequence level by setting the flag sps_ref_wraparound_engabled_flag to be equal to zero when the value of (CtbSizeY/MinCbSizeY+1) is larger than or equal to the value of (pic_width_in_luma_samples/MinCbSizeY−1).

Horizontal Wraparound Motion Compensation Signaling in PPS Some embodiments of the present invention signal information associated with horizontal wraparound motion compensation in a picture level such as in a Picture Parameter Set (PPS) rather than signaling horizontal wraparound motion compensation information in a sequence level. An advantage of signaling horizontal wraparound motion compensation information in the picture level is the flexibility and adaptability of applying horizontal wraparound motion compensation can be improved. In some embodiments, the wraparound offset is signaled in the PPS instead of signaling in the SPS. In one embodiment, a horizontal wraparound motion compensation enable flag pps_ref_wraparound_enabled_flag is signaled in the PPS of a current picture indicating whether horizontal wraparound motion compensation is allowed in the current picture. A wraparound offset is only signaled in the PPS when the horizontal wraparound motion compensation enable flag is equal to one.

In one embodiment, a wraparound enable flag is signaled in a picture level, and a wraparound offset is signaled if the wraparound enable flag indicates horizontal wraparound motion compensation is allowed. An example of Picture Parameter Set (PPS) Raw Byte Sequence Payload (RBSP) syntax is shown in the following.

| | |
|---|---|
| pps_ref_wraparound_enabled_flag | u(1) |
| if( pps_ref_wraparound_enabled_flag ) | |
|     pps_ref_wraparound_offset_minus1 | ue(v) |

The syntax element pps_ref_wraparound_enabled_flag equals to one specifying horizontal wraparound motion compensation may be applied in inter prediction, and the syntax element pps_ref_wraparound_enabled_flag equals to zero specifying horizontal wraparound motion compensation is not applied. The value of this syntax element is equal to zero when the value of (CtbSizeY/MinCbSizeY+1) is larger than or equal to (pic_width_in_luma_samples/MinCbSizeY−1). The syntax element pps_ref_wraparound_offset_minus1 specifies the wraparound offset value minus one used for computing the horizontal wraparound position in units of MinCbSizeY luma samples. The value of ref_wraparound_offset_minus1 is restricted to be in the range of (CtbSizeY/MinCbSizeY)+1 to (pic_width_in_luma_samples/MinCbSizeY)−1, inclusively.

In some other embodiments, information associated with horizontal wraparound motion compensation may be signaled in different levels according to one or more predefined conditions. For example, information of the wraparound offset is signaled in the SPS when RPR is disabled while information of the wraparound offset is signaled in the PPS when RPR is enabled. The sequence parameter set RBSP syntax and the picture parameter set RBSP syntax of this example is shown in the following.

Sequence Parameter Set RBSP Syntax

| | |
|---|---|
| sps_ref_wraparound_enabled_flag | u(1) |
| if(! ref_pic_resampling_enabled_flag && | |
| sps_ref_wraparound_enabled_flag){ | |
|     sps_ref_wraparound_offset_minus1 | ue(v) |
| } | |
| } | |

Picture Parameter Set RBSP Syntax

| | |
|---|---|
| pps_ref_wraparound_present_flag | u(1) |
| if( pps_ref_wraparound_present_flag ) | |
|     pps_ref_wraparound_offset_minus1 | ue(v) |

The syntax element sps_ref_wraparound_enabled_flag specifies whether horizontal wraparound motion compensation may be applied in inter prediction, the syntax element ref_pic_resampling_enabled_flag specifies whether reference picture resampling may be applied when decoding coded pictures in the Coded Layer-wise Video Sequences (CLVSs) referring to the SPS, and the syntax element sps_ref_wraparound_offset_minus1 specifies the wraparound offset used for computing the horizontal wraparound position in units of MinCbSizeY luma samples. The value of sps_ref_wraparound_offset_minus1 shall be in the range of (CtbSizeY/MinCbSizeY)+1 to (pic_width_in_luma_samples/MinCbSizeY)−1, inclusively, where pic_width_in_luma_samples is the value of the picture width in any PPS that refers to this SPS. The syntax element pps_ref_wraparound_present_flag specifies whether information associated with horizontal wraparound motion compensation may be signaled in the PPS. The value of this PPS wraparound present flag is equal to zero when the value of (CtbSizeY/MinCbSizeY+1) is larger than or equal to (pic_width_in_luma_samples/MinCbSizeY−1). In one embodiment, this PPS wraparound present flag is set to zero when a reference picture resampling enable flag ref_pic_resampling_enabled_flag is 0, which implies information associated with horizontal wraparound motion compensation is not present in the PPS when reference picture resampling is disabled. The information associated with horizontal wraparound motion compensation such as the wraparound offset is signaled in the SPS when reference picture resampling is disabled, while the information associated with horizontal wraparound motion compensation is signaled in the PPS when reference picture resampling is enabled. The syntax element pps_ref_wraparound_offset_minus1 specifies the offset used for computing the horizontal wraparound position in units of MinCbSizeY luma samples. The value of ref_wraparound_offset_minus1 is restricted to be in the range of (CtbSizeY/MinCbSizeY)+1 to (ref_width_in_luma_samples/MinCbSizeY)−1, inclusively.

In another embodiment, information associated with horizontal wraparound motion compensation is signaled in multiple levels including sequence, picture, and block levels. For example, a SPS wraparound enable flag is signaled in the SPS, a PPS wraparound enable flag is signaled in the PPS when the SPS wraparound enable flag is equal to one, and a CU wraparound enable flag is signaled for each inter coded CU when the PPS wraparound enable flag is equal to one. The sequence parameter set RBSP syntax and the PPS RBSP syntax of this embodiment is shown in the following.

Sequence Parameter Set RBSP Syntax

| | |
|---|---|
| sps_ref_wraparound_enabled_flag | u(1) |

Picture Parameter Set RBSP Syntax

| | |
|---|---|
| pps_ref_wraparound_enabled_flag | u(1) |
| if( pps_ref_wraparound_present_flag ) | |
|     pps_ref_wraparound_offset | ue(v) |

The syntax element pps_ref_wraparound_present_flag specifies whether horizontal wraparound motion compensation may be applied in inter prediction for all pictures referring to the PPS. In one embodiment, the value of this syntax element is zero when the value of (CtbSizeY/MinCbSizeY+1) is larger than or equal to (pic_width_in_luma_samples/MinCbSizeY−1). The value of this syntax element is zero when reference picture resampling is enabled according to an embodiment. The syntax element pps_ref_wraparound_present_flag is equal to zero when the syntax element sps_ref_wraparound_enabled_flag is equal to zero.

Disable Horizontal Wraparound Motion Compensation by Comparing Current and Reference Pictures In some embodiments of the present invention, horizontal wraparound motion compensation is only supported when the picture sizes are the same between current and reference pictures. That is horizontal wraparound motion compensation is disabled when the picture sizes of the current picture and the reference picture are different. In one embodiment, a picture width of the current picture is compared with a picture width of the reference picture, and the video encoder or decoder determines the picture sizes of the current and reference pictures are different when the picture widths of the current and reference pictures are different. In another embodiment, both the picture width and picture height of the current picture are compared with the picture width and picture height of the reference picture, and the picture sizes of the current and reference pictures are determined to be different when at least one of the picture widths and picture heights between the current and reference pictures are different. For example, horizontal wraparound motion compensation can be enabled when both the picture width and picture height of the current picture are the same as the picture width and picture height of the reference picture (i.e. pic_width==refPic_width && pic_height==refPic_height). In one embodiment, the video encoder or decoder checks if scaling is required to scale the reference picture for predicting the current block in the current picture, and the picture sizes of the current picture and the reference picture are deemed to be different when scaling is applied to scale the reference picture.

In some embodiments, the video encoder or decoder determines if scaling is applied to the reference picture, and disables horizontal wraparound motion compensation when scaling is applied to the reference picture. An embodiment of scaling is horizontal scaling, and no horizontal scaling means that picture output widths PicOutputWidthL are the same between the current picture and the reference picture. The video encoder or decoder compares picture output widths of the current picture and the reference picture, and determines horizontal scaling is applied to the reference picture when the picture output widths of the current and reference pictures are different. In another embodiment, the video encoder or decoder further compares picture output height PicOutputHeightL of the current picture and the reference picture, and disables horizontal wraparound motion compensation when the picture output heights of the current and reference pictures are different. The picture output widths and the picture output heights represent the picture dimension of the current and reference pictures after applying scaling window. For example, horizontal wraparound motion compensation is enabled when the picture output width of the current picture is the same as the picture output width of the reference picture and the picture output height of the current picture is the same as the picture output height of the reference picture (i.e. PicOutputWidth==refPicOutputWidth && PicOutputHeight==refPicOutputHeight).

In one embodiment, instead of comparing the picture output widths and heights of the current and reference picture, scaling window offsets at the four sides of the current and reference pictures are compared to determine whether scaling is applied to the reference picture. The scaling window offsets include a scaling window left offset, a scaling window right offset, a scaling window top offset, and a scaling window bottom offset. For example, horizontal wraparound motion compensation is disabled if any of the scaling window offsets of the current picture is different from the corresponding scaling window offset of the reference picture.

By combining one or more of the above embodiments, the encoder or decoder may implement one of the following scenarios to enable or disable wraparound motion compensation. In one embodiment, horizontal wraparound motion compensation is only supported when both the picture output widths and picture output heights are the same between the current and reference pictures. In another embodiment, horizontal wraparound motion compensation is only supported when both the picture output widths and picture sizes are the same between the current and reference pictures. In yet another embodiment, horizontal wraparound motion compensation is only supported when all the picture output widths, picture output heights, and picture sizes are the same between the current and reference pictures. For example, horizontal wraparound motion compensation is enabled when all the picture widths, picture heights, picture output widths, and picture output heights are the same between the current picture and reference picture (i.e. pic_width==refPic_width && pic_height==refPic_height && PicOutputWidth==refPicOutputWidth && PicOutputHeight==refPicOutputHeight). In another example, horizontal wraparound motion compensation is only enabled when all the picture widths, picture heights, and the scaling window offsets at the four sides are the same between the current and reference pictures.

An embodiment of the video encoder or decoder checks if inter-layer referencing is allowed in inter prediction, and disables horizontal wraparound motion compensation when inter-layer referencing is allowed in inter prediction. Scaling of a reference picture is required when the reference picture and the current picture are in different layers. An inter-layer reference picture present flag is signaled in the video bitstream by the video encoder indicating whether inter-layer referencing is allowed, so the video decoder disables horizontal wraparound motion compensation when the inter-layer reference picture present flag is equal to one according to this embodiment. In one embodiment, the inter-layer reference picture present flag is signaled in a SPS level. The value of a wraparound enable flag in the SPS or PPS is depending on the value of the inter-layer reference picture present flag according to one embodiment. A wraparound offset is adaptively signaled according to the value of the inter-layer reference picture present flag according to another embodiment.

Some embodiments of disabling horizontal wraparound motion compensation set a value of a wraparound enable flag to be equal to zero, where the wraparound enable flag is signaled in or parsed from a block level, a slice level, a picture level, or a sequence level. For example, a wraparound enable flag for a current block in a current picture is set to zero when the picture sizes of the current and reference pictures are different. In another example, a wraparound enable flag for a current block in a current picture is set to zero when scaling of a reference picture is required for predicting the current block. In one embodiment, a high-level wraparound enable flag is signaled in a picture level such as in a PPS, and a block-level wraparound enable flag is signaled for a current block in a current picture referring to the PPS. The block-level wraparound enable flag is set to zero when the high-level wraparound enable flag is equal to zero or when picture sizes of the current and reference pictures are different. The block-level wraparound enable flag is set to one only when the high-level wraparound enable flag is equal to one and the picture sizes of the current and reference pictures are the same. An embodiment of the video encoder determines whether to enables or disables horizontal wraparound motion compensation for a current block at a luma sample bilinear interpolation process in the Decoder-side Motion Vector Refinement (DMVR) operation, and accordingly, the video encoder performs horizontal wraparound motion compensation for the current block in the motion compensation process. An example of the current block is a Coding Unit (CU). In cases when a high-level wraparound enable flag parsed from a PPS is equal to one, for each inter predicted block in a picture referring to the PPS, an embodiment of the video decoder determines horizontal wraparound motion compensation is enabled or disabled for each inter predicted block according to a block-level wraparound enable flag.

Figure 4:
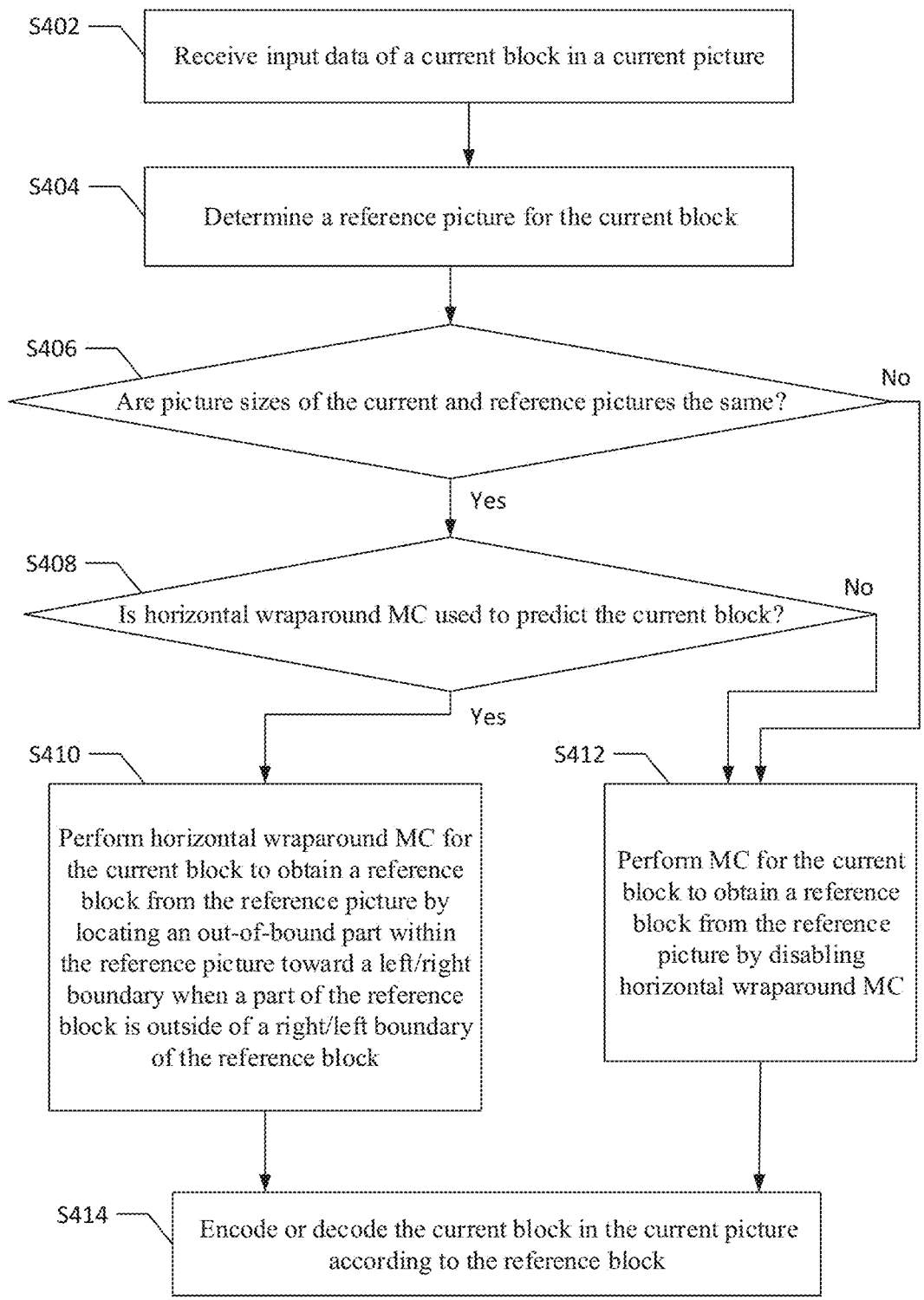
FIG. 4 is a flowchart showing an embodiment of video processing method which disables horizontal wraparound motion compensation according to picture sizes between current and reference pictures.

Exemplary Flowchart for Disabling Horizontal Wraparound Motion Compensation by Comparing Current and Reference Pictures FIG. 4 illustrates an exemplary flowchart of a video encoding or decoding system for processing a current block to be encoded or decoded by inter prediction according to an embodiment of the present invention. The video encoding or decoding system receives input data associated with a current block located in a current picture in Step S402. The current block is an inter predicted block or the current block is to be coded by inter prediction. A reference picture is determined for the current block in step S404. The video encoding or decoding system checks if picture sizes of the current picture and the reference picture are the same in step S406, and further checks whether the current block is predicted or to be predicted by horizontal wraparound motion compensation in step S408 when the picture sizes of the current and reference pictures are the same. Some examples of step S406 determine the picture sizes of the current and reference pictures are the same when picture widths are the same, picture heights are the same, horizontal scaling is not required, scaling is not required, picture output widths are the same, picture output heights are the same, scaling window offsets are the same, or when any combination of the above criteria is true. In cases when the picture sizes of the current and reference pictures are different in step S406 or horizontal wraparound motion compensation is not used to predict the current block in step S408, the video encoding or decoding system performs motion compensation for the current block to obtain a reference block from the reference picture in step S412, where the current block is not coded or to be coded by horizontal wraparound motion compensation. The video encoding or decoding system performs horizontal wraparound motion compensation for the current block to obtain a reference block from the reference picture in step S410. In step S410, an out-of-bound part is located within the reference picture toward a left/right boundary when a part of the reference block is outside of a right/left boundary of the reference picture. The reference block obtained in step S410 or step S412 is used to encode or decode the current block in the current picture in step S414.

Mutually Exclusive RPR and Horizontal Wraparound Motion Compensation Some other embodiments of the present invention mutually exclusives Reference Picture Resampling (RPR) and horizontal wraparound motion compensation. In these embodiments, horizontal wraparound motion compensation is disabled when RPR is enabled. For example, a wraparound enable flag signaled in a SPS level is set to zero when RPR is enabled. Two examples of the SPS RB SP syntax are shown in the following. The syntax element sps_ref_wraparound_enabled_flag specifies whether horizontal wraparound motion compensation may be applied in inter prediction, the syntax element ref_pic_resampling_enabled_flag specifies whether reference picture resampling may be applied when decoding coded pictures in the CLVSs referring to the SPS. The syntax element sps_ref_wraparound_offset_minus1 specifies the offset used for computing the horizontal wraparound position in units of MinCbSizeY luma samples.

| sps_ref_wraparound_enabled_flag | u(1) |
|---|---|
| if(! ref_pic_resampling_enabled_flag && sps_ref_wraparound_enabled_flag){ | |
|     sps_ref_wraparound_offset_minus1 | ue(v) |
| } | |
| } | |

| if(! ref_pic_resampling_enabled_flag ){ | |
|---|---|
|     sps_ref_wraparound_enabled_flag | u(1) |
|     if(sps_ref_wraparound_enabled_flag){ | |
|         sps_ref_wraparound_offset_minus1 | ue(v) |
|     } | |
| } | |

In some other embodiments, inter-layer referencing is considered in determining whether horizontal wraparound motion compensation is enabled, that is, horizontal wraparound motion compensation is disabled when RPR is enabled or when inter-layer referencing is enabled. For example, a wraparound enable flag signaled in a SPS is set to zero when RPR is enabled or when an inter-layer reference picture present flag inter_layer_ref_pics_present_flag is equal to one. Two examples of the sequence parameter set RBSP syntax are shown in the following. The syntax element inter_layer_ref_pics_present_flag specifies whether Inter Layer Reference Picture (ILRP) may be used for inter prediction of any coded picture in the CLVS. In one embodiment, the value of inter_layer_ref_pics_present_flag is inferred to be equal to zero when sps_video_parameter_set_id is equal to zero. The value of inter_layer_ref_pics_present_flag shall be equal to zero when vps_independent_layer_flag[GeneralLayerIdx [nuh_layer_id]] is equal to one.

| sps_ref_wraparound_enabled_flag | u(1) |
|---|---|
| if(! ref_pic_resampling_enabled_flag && sps_ref_wraparound_enabled_flag && ! inter_layer_ref_pics_present_flag ){ | |
|     sps_ref_wraparound_offset_minus1 | ue(v) |
| } | |

| if(! ref_pic_resampling_enabled_flag && ! inter_layer_ref_pics_present_flag){ | |
|---|---|
|     sps_ref_wraparound_enabled_flag | u(1) |
|     if(sps_ref_wraparound_enabled_flag){ | |
|         sps_ref_wraparound_offset_minus1 | ue(v) |
|     } | |
| } | |

Figure 5:
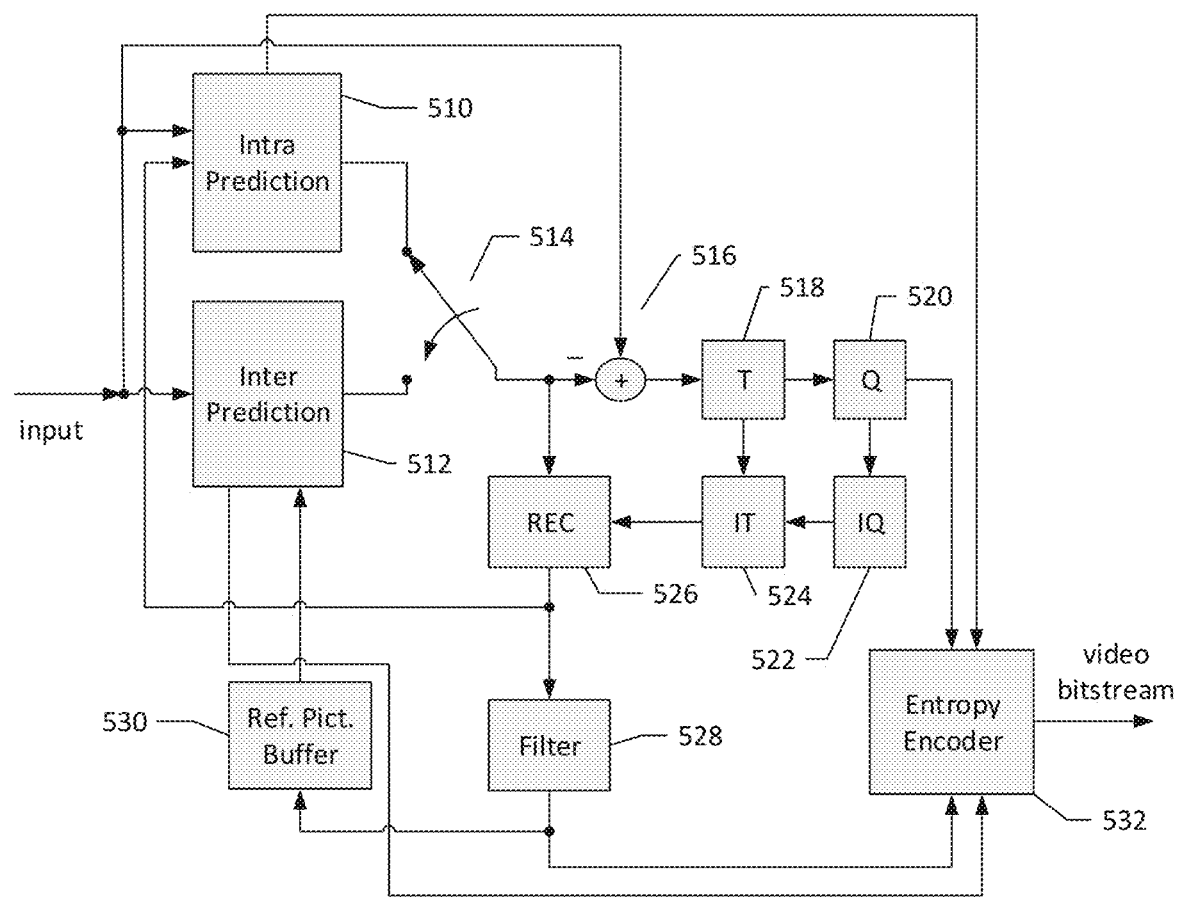
FIG. 5 illustrates an exemplary system block diagram for a video encoding system incorporating the video processing method according to embodiments of the present invention.

Video Encoder and Decoder Implementations The foregoing proposed video processing methods for sub-block motion compensation can be implemented in video encoders or decoders. For example, a proposed video processing method is implemented in an inter prediction module of an encoder, and/or an inter prediction module of a decoder. In another example, a proposed video processing method is implemented in a Decoder-side Motion Vector Refinement (DMVR) module and a Motion Compensation (MC) module of an encoder, and/or a DMVR module and a MC module of a decoder. Alternatively, any of the proposed methods is implemented as a circuit coupled to one or a combination of the inter prediction module and/or one or a combination of the inter prediction module of the decoder, so as to provide the information needed by the inter prediction module. FIG. 5 illustrates an exemplary system block diagram for a Video Encoder 500 implementing various embodiments of the present invention. An Intra Prediction module 510 provides intra predictors based on reconstructed video data of a current picture. An Inter Prediction module 512 performs motion estimation (ME) and MC to provide inter predictors based on video data from other picture or pictures. To encode a current block in a current picture according to some embodiments of the present invention, horizontal wraparound motion compensation is not allowed when picture sizes of the current and reference pictures are different or/and when scaling is required to scale the reference picture. The Inter Prediction module 512 determines a reference block in the reference picture for the current block, and if horizontal wraparound motion compensation is allowed in encoding the current block, an out-of-bound part of the reference block is located within the reference picture toward a left/right boundary when a part of the reference block is outside of a right/left boundary of the reference picture. Otherwise, the out-of-bound part of the reference block is derived by padding when a part of the reference block is outside of a right/left boundary of the reference picture. Either the Intra Prediction module 510 or Inter Prediction 512 supplies the selected predictor to an Adder 516 to form prediction errors, also called prediction residual. The prediction residual of the current block are further processed by a Transformation module (T) 518 followed by a Quantization module (Q) 520. The transformed and quantized residual signal is then encoded by an Entropy Encoder 532 to form a video bitstream. The video bitstream is then packed with side information. The transformed and quantized residual signal of the current block is then processed by an Inverse Quantization module (IQ) 522 and an Inverse Transformation module (IT) 524 to recover the prediction residual. As shown in FIG. 5, the prediction residual is recovered by adding back to the selected predictor at a Reconstruction module (REC) 526 to produce reconstructed video data. The reconstructed video data may be stored in a Reference Picture Buffer (Ref. Pict. Buffer) 530 and used for prediction of other pictures. The reconstructed video data recovered from the REC module 526 may be subject to various impairments due to encoding processing; consequently, an In-loop Processing Filter 528 is applied to the reconstructed video data before storing in the Reference Picture Buffer 530 to further enhance picture quality.

Figure 6:
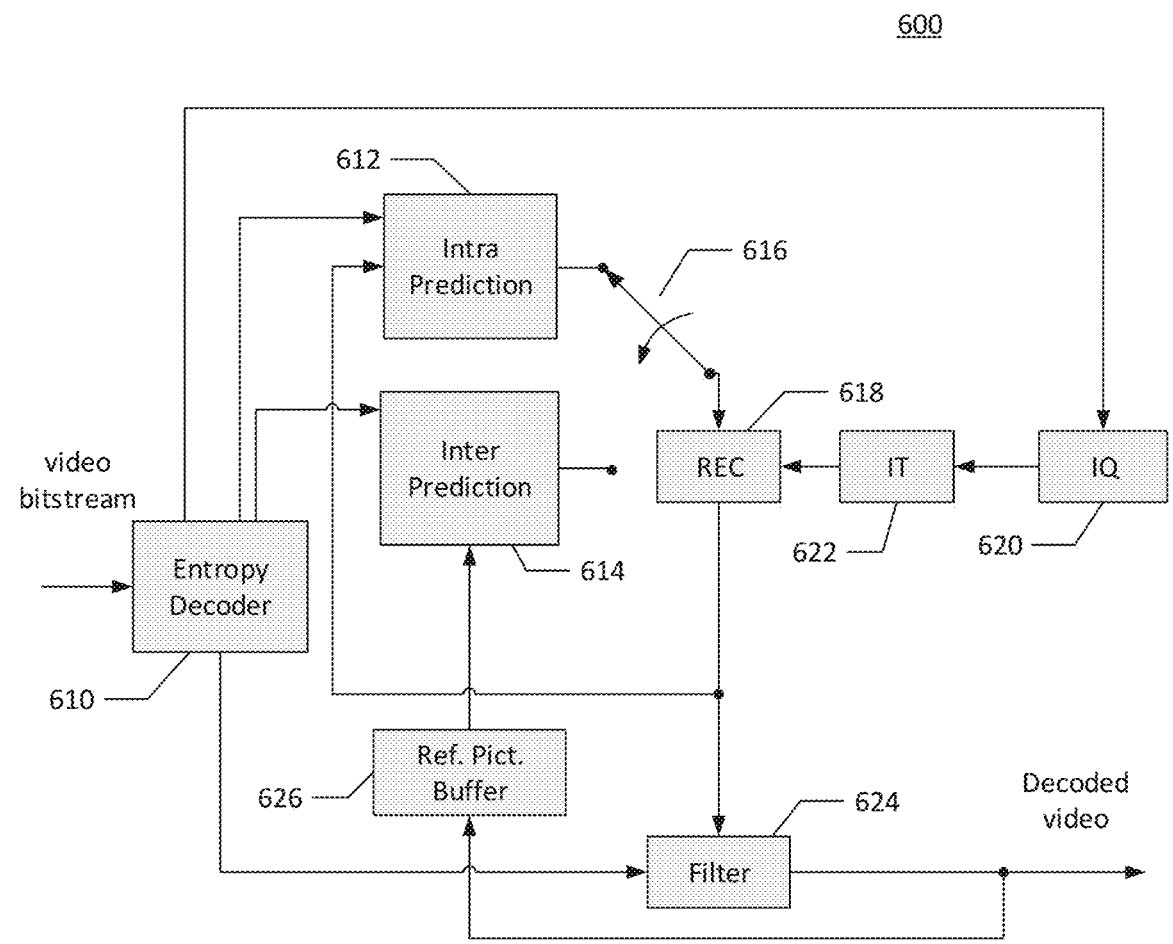
FIG. 6 illustrates an exemplary system block diagram for a video decoding system incorporating the video processing method according to embodiments of the present invention.

A corresponding Video Decoder 600 for decoding the video bitstream generated from the Video Encoder 500 of FIG. 5 is shown in FIG. 6. The video bitstream is the input to Video Decoder 600 and is decoded by Entropy Decoder 610 to parse and recover the transformed and quantized residual signal and other system information. The decoding process of Decoder 600 is similar to the reconstruction loop at Encoder 500, except Decoder 600 only requires motion compensation prediction in Inter Prediction 614. Each block is decoded by either an Intra Prediction module 612 or Inter Prediction module 614. To decode a current block in a current picture according to some embodiments of the present invention, the Inter Prediction module 614 determines whether horizontal wraparound motion compensation is used to predict the current block, where horizontal wraparound motion compensation is disabled when picture sizes of the current and reference pictures are different or when scaling is required to scale the reference picture. The Inter Prediction module 614 performs motion compensation for the current block to obtain a reference block in the reference picture. In cases when horizontal wraparound motion compensation is enabled for decoding the current block, an out-of-boundary part is located within the reference picture toward a right/left boundary when a part of the reference block is outside of a left/right boundary of the reference picture. A Switch 616 selects an intra predictor from the Intra Prediction module 612 or an inter predictor from the Inter Prediction module 614 according to decoded mode information. The transformed and quantized residual signal associated with each block is recovered by an Inverse Quantization module (IQ) 620 and an Inverse Transformation module (IT) 622. The recovered residual signal is reconstructed by adding back the predictor in a REC module 618 to produce reconstructed video. The reconstructed video is further processed by an In-loop Processing Filter (Filter) 624 to generate final decoded video. If the currently decoded picture is a reference picture for later pictures in decoding order, the reconstructed video of the currently decoded picture is also stored in the Ref. Pict. Buffer 626.

Various components of Video Encoder 500 and Video Decoder 600 in FIG. 5 and FIG. 6 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in Encoder 500 and Decoder 600, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 5 and 6, Encoder 500 and Decoder 600 may be implemented in the same electronic device, so various functional components of Encoder 500 and Decoder 600 may be shared or reused if implemented in the same electronic device.

Embodiments of the video processing method for encoding or decoding may be implemented in a circuit integrated into a video compression chip or program codes integrated into video compression software to perform the processing described above. For examples, determining whether picture sizes of the current and reference picture are the same may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method in a video coding system, comprising:
   receiving input video data associated with a current block in a current picture;
   determining a reference picture for the current block stored in a reference picture buffer of the video coding system;
   determining whether the reference picture stored in the reference picture buffer is scaled with respect to the current picture;
   determining whether horizontal wraparound motion compensation is enabled for predicting the current block, including
      determining that the horizontal wraparound motion compensation is enabled for predicting the current block in response to a wraparound enable flag indicating that the horizontal wraparound motion compensation is enabled and the reference picture being determined as not scaled with respect to the current picture, and
      determining that the horizontal wraparound motion compensation is disabled for predicting the current block in response to the reference picture being determined as scaled with respect to the current picture;
   performing motion compensation for the current block to obtain a reference block from the reference picture, wherein when the horizontal wraparound motion compensation is determined as enabled for predicting the current block, an out-of-boundary part is located within the reference picture toward a right boundary when a part of the reference block is outside of a left boundary of the reference picture or an out-of-boundary part is located within the reference picture toward a left boundary when a part of the reference block is outside of a right boundary of the reference picture; and
   encoding or decoding the current block according to the reference block.

2. The method of claim 1, wherein the determining whether the reference picture stored in the reference picture buffer is scaled with respect to the current picture comprises:
   comparing a picture width of the current picture with a picture width of the reference picture; and
   determining that the reference picture stored in the reference picture buffer is scaled with respect to the current picture when the picture width of the current picture and the picture width of the reference picture are different.

3. The method of claim 2, wherein the determining whether the reference picture stored in the reference picture buffer is scaled with respect to the current picture further comprises:
   comparing a picture height of the current picture with a picture height of the reference picture; and
   determining that the reference picture stored in the reference picture buffer is scaled with respect to the current picture when at least one of the picture width and the picture height of the current picture is different from the picture width or the picture height of the reference picture.

4. The method of claim 1, wherein the determining whether the reference picture stored in the reference picture buffer is scaled with respect to the current picture comprises:
   checking if horizontal scaling is required for scaling the reference picture; and
   determining that the reference picture stored in the reference picture buffer is scaled with respect to the current picture when the horizontal scaling is applied to scale the reference picture for predicting the current block in the current picture.

5. The method of claim 1, wherein the determining whether the reference picture stored in the reference picture buffer is scaled with respect to the current picture comprises:
   checking if scaling is required for scaling the reference picture; and
   determining that the reference picture stored in the reference picture buffer is scaled with respect to the current picture when one or both of horizontal scaling and vertical scaling is applied to scale the reference picture for predicting the current block in the current picture.

6. The method of claim 1, further comprising:
   determining if scaling is applied to the reference picture; and
   disabling the horizontal wraparound motion compensation when the scaling is applied to the reference picture.

7. The method of claim 6, wherein the determining if the scaling is applied to the reference picture comprises:
   comparing picture output widths of the current picture and the reference picture; and
   determining that the scaling is applied to the reference picture when the picture output widths of the current picture and the reference picture are different.

8. The method of claim 7, further comprising:
   comparing picture output heights of the current picture and the reference picture; and
   determining that the horizontal wraparound motion compensation is disabled when the picture output heights of the current picture and the reference picture are different.

9. The method of claim 6, wherein the determining if the scaling is applied to the reference picture comprises:
   comparing scaling window offsets at four sides of the current picture and scaling window offsets at four sides of the reference picture; and
   determining that the scaling is applied to the reference picture when any of the scaling windows offsets are different between the current picture and the reference picture.

10. The method of claim 1, wherein the horizontal wraparound motion compensation is disabled when an inter-layer reference picture present flag is equal to 1, wherein the inter-layer reference picture present flag equal to 1 specifies inter-layer referencing is allowed in inter prediction.

11. The method of claim 1, wherein the horizontal wraparound motion compensation is disabled when reference picture resampling is enabled, wherein the reference picture resampling supports spatial scalability by allowing picture sizes of reference pictures different from the current picture.

12. The method of claim 1, wherein the wraparound enable flag is parsed from one or a combination of a Coding Unit (CU) level, picture level, and sequence level.

13. The method of claim 12, wherein the wraparound enable flag is parsed from one or both of Picture Parameter Set (PPS) and Sequence Parameter Set (SPS).

14. The method of claim 1, further comprising determining a wraparound offset when the horizontal wraparound motion compensation is enabled for predicting the current block, wherein the out-of-boundary part is located within the reference block toward the left boundary or the right boundary according to the wraparound offset.

15. The method of claim 14, wherein the wraparound offset is signaled in or parsed from a Picture Parameter Set (PPS).

16. An apparatus of processing video data in a video coding system, the apparatus comprising one or more electronic circuits configured to:
   receive input video data associated with a current block in a current picture;
   determine a reference picture for the current block stored in a reference picture buffer of the video coding system;
   determine whether the reference picture stored in the reference picture buffer is scaled with respect to the current picture;
   determine whether horizontal wraparound motion compensation is enabled for predicting the current block, wherein the one or more electronic circuits are configured to:
      determine that the horizontal wraparound motion compensation is enabled for predicting the current block in response to a wraparound enable flag indicating that the horizontal wraparound motion compensation is enabled and the reference picture being determined as not scaled with respect to the current picture, and
      determine that the horizontal wraparound motion compensation is disabled for predicting the current block in response to the reference picture being determined as scaled with respect to the current picture;
   perform motion compensation for the current block to obtain a reference block from the reference picture, wherein when the horizontal wraparound motion compensation is determined as enabled for predicting the current block, an out-of-boundary part is located within the reference picture toward a right boundary when a part of the reference block is outside of a left boundary of the reference picture or an out-of-boundary part is located within the reference picture toward a left boundary when a part of the reference block is outside of a right boundary of the reference picture; and
   encode or decode the current block according to the reference block.

17. A non-transitory computer readable medium storing program instruction causing a processing circuit of an apparatus to perform video processing method, and the method comprising:
   receiving input video data associated with a current block in a current picture;
   determining a reference picture for the current block stored in a reference picture buffer of the video coding system;
   determining whether the reference picture stored in the reference picture buffer is scaled with respect to the current picture;
   determining whether horizontal wraparound motion compensation is enabled for predicting the current block, including
      determining that the horizontal wraparound motion compensation is enabled for predicting the current block in response to a wraparound enable flag indicating that the horizontal wraparound motion compensation is enabled and the reference picture being determined as not scaled with respect to the current picture, and
      determining that the horizontal wraparound motion compensation is disabled for predicting the current block in response to the reference picture being determined as scaled with respect to the current picture;
   performing motion compensation for the current block to obtain a reference block from the reference picture, wherein when the horizontal wraparound motion compensation is determined as enabled for predicting the current block, an out-of-boundary part is located within the reference picture toward a right boundary when a part of the reference block is outside of a left boundary of the reference picture or an out-of-boundary part is located within the reference picture toward a left boundary when a part of the reference block is outside of a right boundary of the reference picture; and
   encoding or decoding the current block according to the reference block.

18. The apparatus of claim 16, wherein the one or more electronic circuits are further configured to:
   compare a picture width of the current picture with a picture width of the reference picture or compare a picture height of the current picture with a picture height of the reference picture; and
   determine that the reference picture stored in the reference picture buffer is scaled with respect to the current picture when the picture width of the current picture and the picture width of the reference picture are different or when the picture height of the current picture and the picture height of the reference picture are different.

19. The non-transitory computer readable medium of claim 17, wherein the program instruction causes the processing circuit to perform the video processing method that further comprises:
   comparing a picture width of the current picture with a picture width of the reference picture or compare a picture height of the current picture with a picture height of the reference picture; and
   determining that the reference picture stored in the reference picture buffer is scaled with respect to the current picture when the picture width of the current picture and the picture width of the reference picture are different or when the picture height of the current picture and the picture height of the reference picture are different.

* * * * *